(12) United States Patent
Vinogradov et al.

(10) Patent No.: US 12,372,737 B2
(45) Date of Patent: Jul. 29, 2025

(54) AUTOFOCUS OPTICAL ARRANGEMENTS AND ASSEMBLIES INCLUDING VOICE COIL MOTORS

(71) Applicant: ZEBRA TECHNOLOGIES CORPORATION, Lincolnshire, IL (US)

(72) Inventors: Igor Vinogradov, Oakdale, NY (US); David T. Shi, Setauket, NY (US); Chinh Tan, East Setauket, NY (US); Vladimir Gurevich, Great Neck, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 357 days.

(21) Appl. No.: 17/006,628

(22) Filed: Aug. 28, 2020

(65) Prior Publication Data

US 2022/0066126 A1 Mar. 3, 2022

(51) Int. Cl.
*G02B 7/09* (2021.01)
*G02B 9/12* (2006.01)
*G02B 13/18* (2006.01)

(52) U.S. Cl.
CPC ............... *G02B 7/09* (2013.01); *G02B 9/12* (2013.01); *G02B 13/18* (2013.01)

(58) Field of Classification Search
CPC . G02B 7/09; G02B 9/12; G02B 13/18; G02B 7/28; G02B 15/143103; G02B 13/02; G02B 7/04; G02B 15/04; G02B 15/1421; G02B 15/22; G02B 15/24; G02B 15/143; G02B 15/14; G06K 7/10; G06K 7/10821; G06K 7/10831

USPC ....... 359/676, 680, 689, 694, 696, 698, 705, 359/715, 716, 237, 692, 684.739, 740
See application file for complete search history.

(56) References Cited

U.S. PATENT DOCUMENTS

| | | | |
|---|---|---|---|
| 2003/0112530 A1* | 6/2003 | Sato | G02B 9/34 359/772 |
| 2009/0161228 A1 | 6/2009 | Lee | |
| 2009/0224051 A1 | 9/2009 | Vinogradov | |
| 2015/0168677 A1* | 6/2015 | Lee | H04N 23/45 348/222.1 |

(Continued)

OTHER PUBLICATIONS

International Search Report and Written Opinion for International Application No. PCT/US2021/038474 mailed on Sep. 28, 2021.

*Primary Examiner* — Thomas K Pham
*Assistant Examiner* — Kuei-Jen L Edenfield
(74) *Attorney, Agent, or Firm* — Yuri Astvatsaturov (57) ABSTRACT

Autofocus (AF) optical arrangements and assemblies including a voice coil motor (VCM) are disclosed. An example optical assembly for a focusing lens includes: a front lens group disposed along an optical axis configured to receive light from the object of interest and configured to correct for aberrations of a first image projected by the front lens group; an aperture disposed along an optical axis configured to receive light from the front lens group therethrough along the optical axis; a moveable focus lens to receive light through the aperture; a VCM configured to move the focus lens to focus the optical assembly; and a back lens group disposed along the optical axis configured to receive light from the focus lens and further configured to correct for field curvature.

16 Claims, 4 Drawing Sheets

(56) References Cited

U.S. PATENT DOCUMENTS

| | | |
|---|---|---|
| 2015/0310243 A1 | 10/2015 | Ackley et al. |
| 2018/0259746 A1 | 9/2018 | Fukaya et al. |
| 2021/0048630 A1* | 2/2021 | Liao .................. G02B 13/0045 |
| 2021/0157090 A1* | 5/2021 | Lin .......................... G02B 7/08 |

* cited by examiner

AUTOFOCUS OPTICAL ARRANGEMENTS AND ASSEMBLIES INCLUDING VOICE COIL MOTORS

BACKGROUND

Imaging devices generally capture images within a given field of view (FOV). It is often required that machine vision devices, barcode readers, etc. capture images with resolution sufficient at suitable distances for effective decoding of indicia captured in an image for use in, e.g., machine vision applications, barcode reading, etc.

SUMMARY

The demand for machine vision applications, barcode reading, etc. is increasing, which increasingly requires the use of smaller sensors, and smaller, less expensive and lighter optical arrangements for such devices. However, such devices still need to be capable of generating images with sufficient resolution, at larger focal lengths, over larger focus ranges, across wider temperature ranges, etc. Some conventional autofocus (AF) optical assemblies use mechanical movement of lenses (e.g., using a step motor) to adjust the focus. Some such solutions may be cost prohibitive, large, slow and/or may wear out with time. Alternatively, a liquid lens may be used to adjust the focus. Some such solutions may be cost prohibitive, and/or may have optical characteristics that vary with time and/or temperature. Thus, there is a need for improved optical arrangements that address at some of these issues and/or other issues.

Moreover, when designing extended-range miniature barcode readers and/or ultra-compact cameras it is desired to have a low cost, durable, long life, and/or compact variable focus lens with increased focal length and extended focusing range, with internal feedback signal for focus stabilization. However, it can be difficult to combine increased focal length, extended focusing range in a compact lens design.

Further, when a moveable focus lens is utilized to adjust focus, optical power range $\Delta OP$ depends on the stroke of the motor $\Delta X$ and the focal length F of the moveable focus lens, and can be expressed mathematically as $\Delta OP = \Delta X/F^2$. Accordingly, the motor stroke $\Delta X$ required for a certain range of optical power $\Delta OP$ increases proportionally to focal length F squared. For example, to achieve focus range $\Delta OP$ of 8 m$^{-1}$ with a focal length F of 8 millimeters, the lens needs to be moveable by 0.51 millimeters, which exceeds the stroke of conventional voice coil motors. Further, conventional voice coil motors often have load bearing limits of less than 100 milligrams. At the same time, while step motors have larger strokes and larger weight bearing capabilities they are quite large, slow, expensive, and may wear out over time.

Thus, there is a need for improved optical arrangements that address at some of these issues and/or other issues. Accordingly, the present application discloses small/miniature optical assemblies that can utilize conventional voice coil motors to adjust focus. Such example optical arrangements and assemblies can be used to implement small, low cost, large range of focal distances, large focus range, cost effective, thermally stable, etc. imaging devices for machine vision applications, barcode reading, etc. Optical power enhancement is also provided by the examples disclosed here. Optical power enhancement can be characterized mathematically as a focusing gain factor $G=\Delta OP^*F^2/\Delta X > 1$.

For the disclosed optical assemblies, the focusing range of optical power can be expressed mathematically as $\Delta OP = G^*\Delta X/F^2$.

To implement small/miniature optical assemblies disclosed examples include: (i) a conventional voice coil motor that moves/adjusts/positions a single plastic moveable focus lens is arranged inside an optical assembly between a fixed front lens group and a back lens group; (ii) the moveable focus lens being an aspheric crown plastic element with optical power substantially larger than total power of the lens assembly and also larger that combined optical power of the front and back lens groups; (iii) the front lens group and moveable focus lens forming a Cook triplet (which may be used to correct aberrations over entire field of view) with a first positive crown glass lens, followed by an aperture, a negative flint aspheric plastic, and the moveable focus lens; and (iv) the back lens group includes one or more plastic aspheric elements and has a substantial negative optical power. Together with strong positive moveable focus lens, it forms a telephoto system to enhance variable optical power range and reduce length of the lens assembly. Also, the back lens group may be used to correct field curvature and match chief ray angle (CRA) of the used sensor. Imaging lens quality can be realized by the disclosed examples sufficient to support four or more megapixel image sensors.

In an embodiment, an optical assembly for a focusing lens includes: a front lens group disposed along an optical axis configured to receive light from the object of interest and configured to correct for aberrations of a first image projected by the front lens group; an aperture disposed along an optical axis configured to receive light from the front lens group therethrough along the optical axis; a moveable focus lens to receive light through the aperture; a voice coil motor configured to move the moveable focus lens to focus the optical assembly; and a back lens group disposed along the optical axis configured to receive light from the moveable focus lens and further configured to correct for field curvature.

In a variation of the current embodiment, the front lens group, the focus lens, and the back lens group are arranged in a telephoto arrangement.

In a variation of the current embodiment, a mount is configured to mount the optical assembly to a barcode reader; and an interface to convey position data for the focus lens to a processor of the barcode reader, and to receive control data for the voice coil motor from the processor, wherein the back lens group is configured to form a second image on an image sensor of the barcode reader, the image sensor is configured to generate an electrical signal representative of the second image, and provide the electrical signal to the processor.

In a variation of the current embodiment, the focus lens is an aspheric crown plastic optical element having an optical power greater than a total power of the optical assembly and greater than a combined optical power of the front lens group and the back lens group.

In a variation of the current embodiment, the back lens group is configured to match a chief ray angle of an image sensor.

In a variation of the current embodiment, the focus lens is an only moveable optical element of the optical assembly.

In a variation of the current embodiment, the front lens group and the back lens group are arranged to prevent damage to the focus lens.

In a variation of the current embodiment, an overall optical power of the front lens group combined with the back lens group is configured to be less than an optical power of the focus lens to at least one of reduce sensitivity to mechanical tolerances, manage imaging lens aberrations, and compensate for thermal variation of the focus lens.

In a variation of the current embodiment, the front lens group includes a lens element L1, a lens element L2, and an aperture stop positioned between the lenses L1 and L2, and wherein the back lens group includes a lens element L3 and a lens element L4.

In a variation of the current embodiment, a lens holder with a front aperture is configured to hold the front lens group, the focus lens, the voice coil motor, and the back lens group in position along the optical axis to form a second image on an image sensor.

In a variation of the current embodiment, an illumination system is configured to illuminate an object for imaging of the object.

In the accompanying figures, like reference numerals refer to identical or functionally similar elements throughout the separate views, together with the detailed description below, are incorporated in and form part of the specification, and serve to further illustrate examples of concepts that include the claimed invention, and explain various principles and advantages of those examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of examples of the invention. In general, the same reference numbers will be used throughout the drawing(s) and accompanying written description to refer to the same or like parts.

The apparatus and method components have been represented where appropriate by conventional symbols in the drawings, showing only those specific details that are pertinent to understanding the examples of the invention so as not to obscure the disclosure with details that will be readily apparent to those of ordinary skill in the art having the benefit of the description herein. Skilled artisans will readily recognize from the following discussion that alternate examples of the structures and methods illustrated herein may be employed without departing from the principles set forth herein.

DETAILED DESCRIPTION

For ease of reference, aspects of this disclosure will be described in connection with lenses and lens elements. However, one of ordinary skill in the art will readily recognize that any other type(s) of optical elements may, additionally and/or alternatively, be used to implement optical assemblies.

Portable, high-performance optical imaging systems for machine vision, barcode reading, etc. applications employ small image sensors to maintain small form factors. For example a typical image sensor has an image sensor rectangular area of around 3 by 3 millimeters with sensor pixels areas of approximately 3 by 3 micrometers, i.e., microns. In some embodiments, the optical assembly 105 is configured to capture images with a modulation transfer function of 40% at 160 line pairs per millimeter. Some high-performance compact imaging systems require a large focal length (e.g., a telephoto optical arrangement with greater than range of focal lengths of 5 to 50 millimeters) and small form factor image sensors. In a preferred embodiment, the focal distance is about 8 millimeters while total lens track or length of the lens is less than 11 millimeters Additionally, autofocusing is commonly required to achieve the resolutions for processing of images required for machine vision, barcode reading, etc. processes. The present application discloses example telephoto optical assemblies that employ at least two lens groups, a moving lens and a voice coil motor to move the moving lens that improve upon current technologies by one or more of: (i) reducing size (e.g., diameter, length, etc.) (ii) reducing manufacturing costs for machine vision, barcode reading, etc. applications, (iii) increasing range of focal distances, (iv) increasing focus range while maintaining manufacturability (e.g., performance in presence of manufacturing tolerances), etc.

Figure 1:
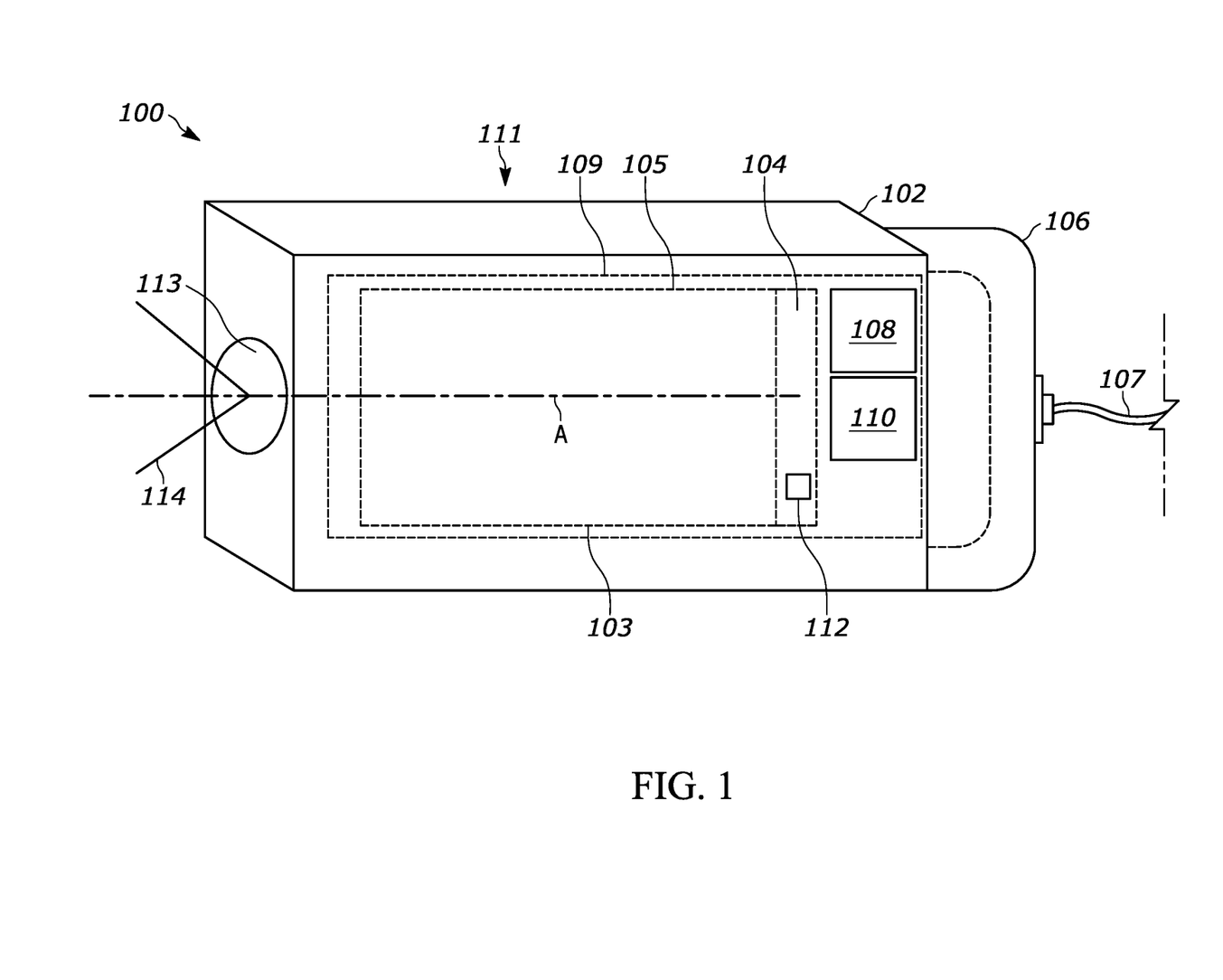
FIG. 1 is a schematic side elevation view of a device having an imaging system, in accordance with aspects of this disclosure.

An example imaging-based device 100 is shown schematically in FIG. 1. The device 100 includes a housing 102, an imaging system 103 at least partially disposed within the housing 102 that includes an imaging camera assembly. Specifically, the imaging system 103 includes an image sensor 104, and an optical assembly 105. The device 100 may be adapted to be inserted into a docking station 106 which, in some examples, may include an a cable or connector 107 to receive power form a power source (e.g., a direct current (DC) or alternating current (AC) power source) to receive power for the device 100. The device 100 may further include an onboard power supply or power storage device 108 such as a battery, and a printed circuit board 109 which may accommodate a memory and a controller 110 that controls operation of the imaging system 103 and, more generally, the device 100. In examples, the may include a trigger (not shown in the illustration for clarity) that is used to activate the imaging system 103 to capture an image. The device 100 may include any number of additional components such as decoding systems, processors, and/or circuitry coupled to the printed circuit board 109 to assist in operation of the device 100.

The housing 102 includes a forward portion 111 which supports the imaging system 103 at least partially within an interior region of the housing 102 using any number of components, assemblies and/or approaches. The imaging system 103 may, but does not have to be, modular as it may be removed or inserted as a unit into devices, allowing the ready substitution of imaging systems 103 having different imaging characteristics (e.g., camera assemblies having different focal distances, working ranges, and FOVs) for use in different devices and systems. In some examples, the field of view may be static.

The image sensor 104 may have a plurality of photosensitive elements, one of which is shown at reference numeral 112 formed in a substantially flat arrangement. The image sensor 104 may be fixedly mounted to the printed circuit board 109 using any number of components, structures, and/or approaches. The image sensor 104 further has a defined central imaging axis 114 that is normal to the substantially flat arrangement. In some examples, the imaging axis 114 is coaxial with a central axis of the optical assembly 105. The optical assembly 105 may be fixedly and/or removably mounted relative to the housing 102 using any number of components and/or approaches.

The imaging sensor 104 may be a one megapixel sensor with pixels of approximately 3 microns in size. In embodiments, the imaging sensor 104 includes 3 millimeter pixels, having a total of about 2 megapixels, resulting in an overall imaging sensor width and length of 3 microns in each dimension. In embodiments, the optical assembly 105 is configured to capture images with a modulation transfer function of 40% at 160 line pairs per millimeter.

In the illustrated example, the optical assembly 105 is positioned between a front aperture 113 and the image sensor 104. The front aperture 113 blocks light from objects outside of a FOV 114 which reduces imaging problems due to stray light from objects other than a target object. Additionally, the front aperture 113 in conjunction with a plurality of lenses, and lens groups allows for an image to form as intended on the image sensor 104. In some examples, the housing 102 includes additional elements such as an illumination system (not shown in the illustration for clarity) configured to illuminate a target object for imaging. The illumination system may include a light emitting diode, laser diode, black body radiation source, or another illumination source.

Figure 2:
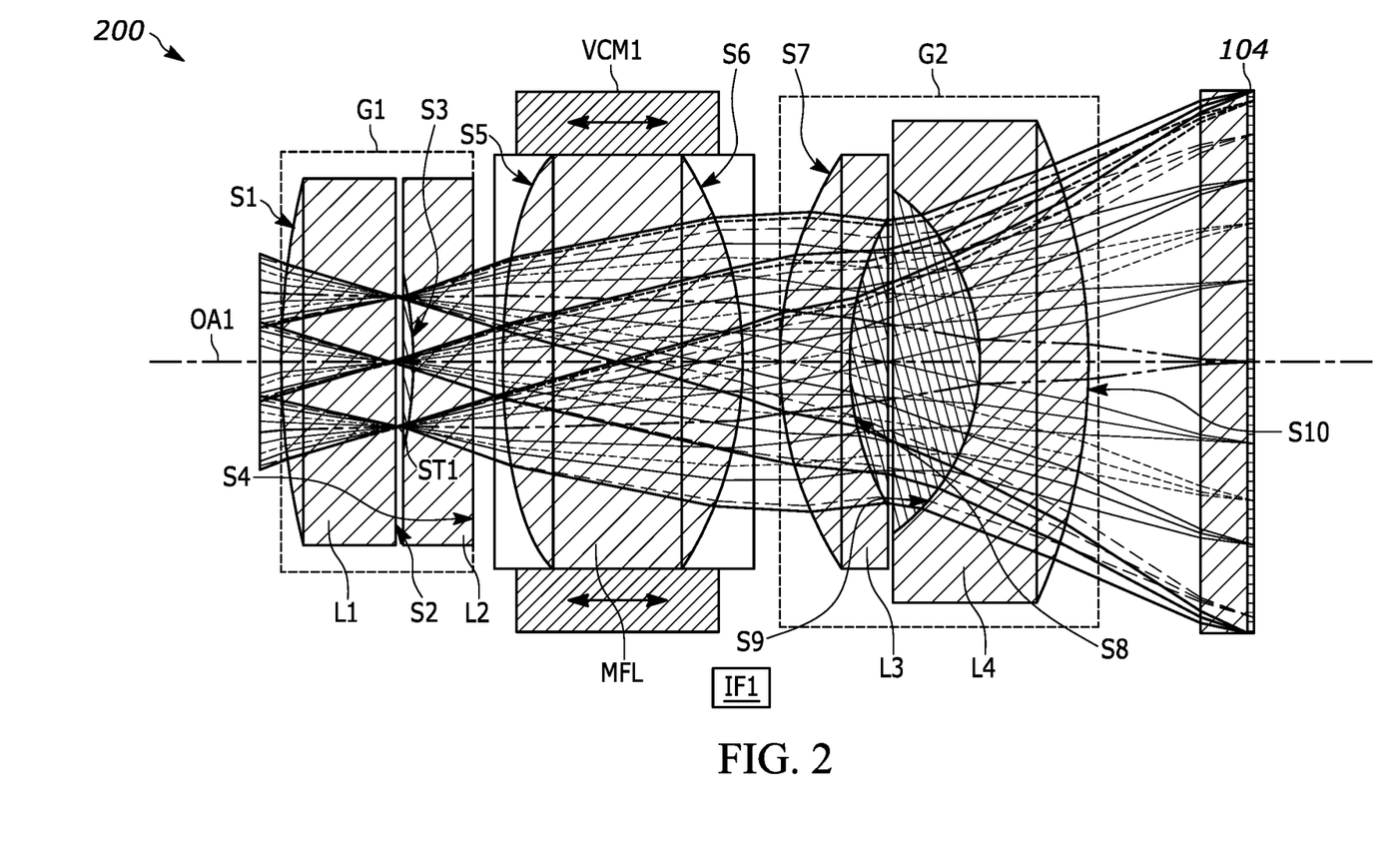
FIG. 2 is a cross-sectional side view of an example optical assembly having a voice coil motor to focus the optical assembly, in accordance with aspects of this disclosure, that may be used to implement the optical assembly of FIG. 1.

FIG. 2 illustrates an example optical assembly in the form of a optical assembly 200 that may be used to implement the example optical assembly 105 of FIG. 1. The example optical assembly 200 includes, among possibly other optical elements, (i) a front lens group G1 including an aperture stop ST1, (ii) an adjustable and/or moveable focus lens MFL, (iii) any type of applicable voice coil motor VCM1 configured to move the movable focus lens MFL over, for example, a range of 160 microns to focus the optical assembly 200, and (iv) a back lens group G2.

Figure 4:
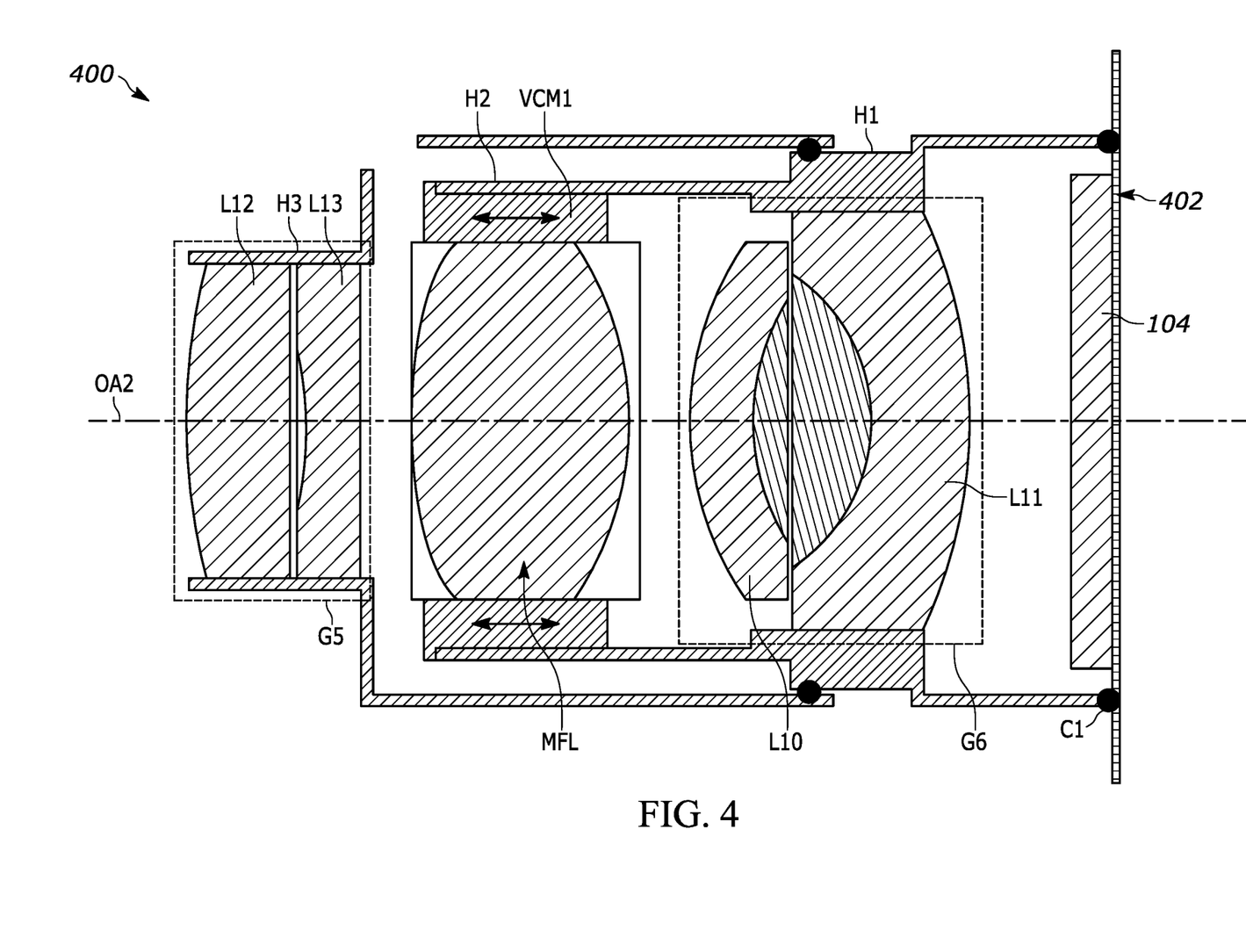
FIG. 4 is a cross-sectional side view of an example mounting assembly to mount the optical assemblies of FIG. 1-3 to a printed circuit board, in accordance with aspects of this disclosure.

As shown in FIG. 4, a mount assembly 400 may be used to hold elements of the optical assembly 200 in a fixed place on a printed circuit board within, for example, a housing such as the housing 102. The mount assembly 400 holds the front lens group G1, the moveable focus lens MFL and the back lens group G2 in a fixed relationship along an optical axis OA1. In some examples, elements of the lens groups G1 and G2 have fixed positions and/or are arranged to prevent damage to the moveable focus lens MFL as the MFL is moved back and forth (e.g., along the optical axis OA1) between the lens groups G1 and G2 by the voice coil motor VCM1 within the optical assembly 200. In some examples, the front lens group G1, the moveable focus lens MEL, and the back lens group G2 are configured and arranged in a telephoto arrangement to increase variable optical power range and/or reduce the length of the optical assembly 200.

The overall length of the optical assembly 200 of FIG. 2 may be approximately 8.5 millimeters with focusing range of 3 to 48 inches. The entire optical assembly 200 is thermally stable, i.e. the focusing does not vary with temperature, therefore the VCM does not need to compensate for the thermal focus shift and does not lose its travel range due to temperature.

The lens first group G1 is disposed along the optical axis OA1 and is configured to receive light from an object of interest (e.g., a barcode) in a FOV and correct for aberrations of a first image projected by the front lens group G1. The front lens group G1 includes one or more lens elements L1 and L2. In the example of FIG. 2, the lens elements L1 and L2 and the moveable focus lens MFL are arranged to form a Cook triplet. In the example of FIG. 2, the lens element L1 is a positive crown glass optical element, and the lens element L2 is a negative flint aspheric plastic optical element. An aperture stop ST1 is formed between the lens elements L1 and L2. The front lens group G1 may include a negative optical element (e.g., a lens element) configured to increase a FOV of the optical assembly 200.

The moveable focus lens MFL is positioned or located between the lens groups G1 and G2 of the optical assembly 200. In the example of FIG. 2, only the moveable focus lens MFL needs to be moved/adjusted/positioned to adjust focus of the optical assembly 200. Because of the focusing gain G gain obtained by the optical assembly of FIG. 2, only a small (e.g., 160 microns) range of motion for the moveable focus lens MFL is needed in the optical assembly of FIG. 2. Accordingly, a small voice coil motor (e.g., 7.1 by 7.1 millimeters) may be used. An example voice coil motor is the JHC-7128 manufactured by Jahwa Electronics Co., Ltd. The moveable focus lens MFL may be an aspheric crown plastic optical element having an optical power greater than the total power of the optical assembly 200 and/or greater than a combined optical power of the front lens group G1 and the back lens group G2. Example plastic materials that may be used to form the moveable focus lens MFL include, but are not limited to, EP6000, OKP1, SP-1516, etc.

The back lens group G2 having lens elements L3 and L4 is disposed along the optical axis OA1, is configured to receive light from the moveable focus lens MFL, correct for field curvature, and form a second image on a solid-state image sensor, such as the image sensor 104. The lens elements L3 and L4 may be plastic aspheric lens elements L3 and L4 arranged to form a negative optical power. In some examples, the lens elements L3 and L4 of the back lens group G2 are configured to provide a chief ray angle of 32 degrees and/or to match a chief ray angle of the image sensor 104.

The low optical power of lens groups G1 and G2 make them less sensitive to mechanical tolerances, and therefore, less complex and less expensive to manufacture. These lens groups G1 and G2 can be used to compensate and control the imaging lens aberrations, and compensate for the thermal variation of the plastic moveable focus lens MFL.

In some examples, lens elements L1 and L2 of front lens group G2, the lens elements L3 and L4 of the back lens group G2, and the moveable focus lens MEL are configured and/or arranged to form a focusing gain of 3.4, a focusing range of 8.6 m$^{-1}$, and a lens focal length of 8 millimeters. In some examples, an overall optical power of the front lens group G1 combined with the back lens group G2 is configured to be less than the optical power of the moveable focus lens MFL to at least one of reduce sensitivity to mechanical tolerances, manage the imaging lens aberrations, and/or compensate for the thermal variation of the focus lens.

The optical assembly 200 is configured to, via any number and/or type(s) of interfaces, such as an interface IF1, convey position data for the moveable focus lens MEL, and receive control data for the voice coil motor VCM1 from a processor (e.g., of the device 100, a machine vision system, a barcode reader, etc.).

The image sensor 104 may be any type of image sensor configured to generate an electrical signal representative of images formed on the image sensor 104, and to provide the electrical signal to a processor (e.g., the controller 110) via the interface IF1 and/or another means. When an object of interest is a barcode, the processor and/or a barcode decoder may decode the barcode to from the electrical signal.

In some examples, the lens element L1 has a spherical surface S1, a substantially flat surface S2 and a positive optical power; the lens element L2 has aspherical surfaces S3 and S4 and a negative optical power; the moveable focus lens MFL has two spherical surfaces S5 and S6 and a positive optical power; and the lens element L3 has aspherical surfaces S7 and S8 and a negative optical power, and a lens element L4 has aspherical surfaces S9 and S10 and a negative optical power.

In some examples, the lens element L1 is formed of a Crown type glass material with an Able value approximately 56, an index of refraction of about 1.70, a positive overall optical power, a first surface S1 of the lens element L1 is spherical, and a second surface S2 of the lens element L1 is substantially flat; the lens element L2 is formed of a plastic material of Flint type with an Abbe value about 23, an index of refraction of about 1.64, a negative overall optical power, and both surfaces S3 and S4 of the lens element L2 are aspherical; the lenses L1 and L2 formed to manage an overall spherical aberration; the moveable focus lens MFL is formed of a plastic material with an Abbe value of 55, an index of refraction of about 1.54, a positive overall optical power, and both surfaces S5 and S6 of the moveable focus lens are aspherical; the lens element L3 is formed of a Crown type plastic material with an Abbe value of 55, an index of refraction of about 1.54, a negative optical power, a first negative optical power aspherical surface S7, and a second negative optical power aspherical surface S8; and the lens element L4 is formed of a Crown type plastic material with Abbe value of 23, an index of refraction of about 1.64, a negative optical power, a first aspherical surface S9 having a negative optical power, and the second aspherical surface S10 have a positive optical power; the lenses L3 and L4 formed to manage at least one of an imaging lens field curvature, and astigmatism, or a distortion. The plastic material used to form the moveable focus lens MFL may be, for example, a K26R material, a Xeonex material, and/or an Acrylic material.

Figure 3:
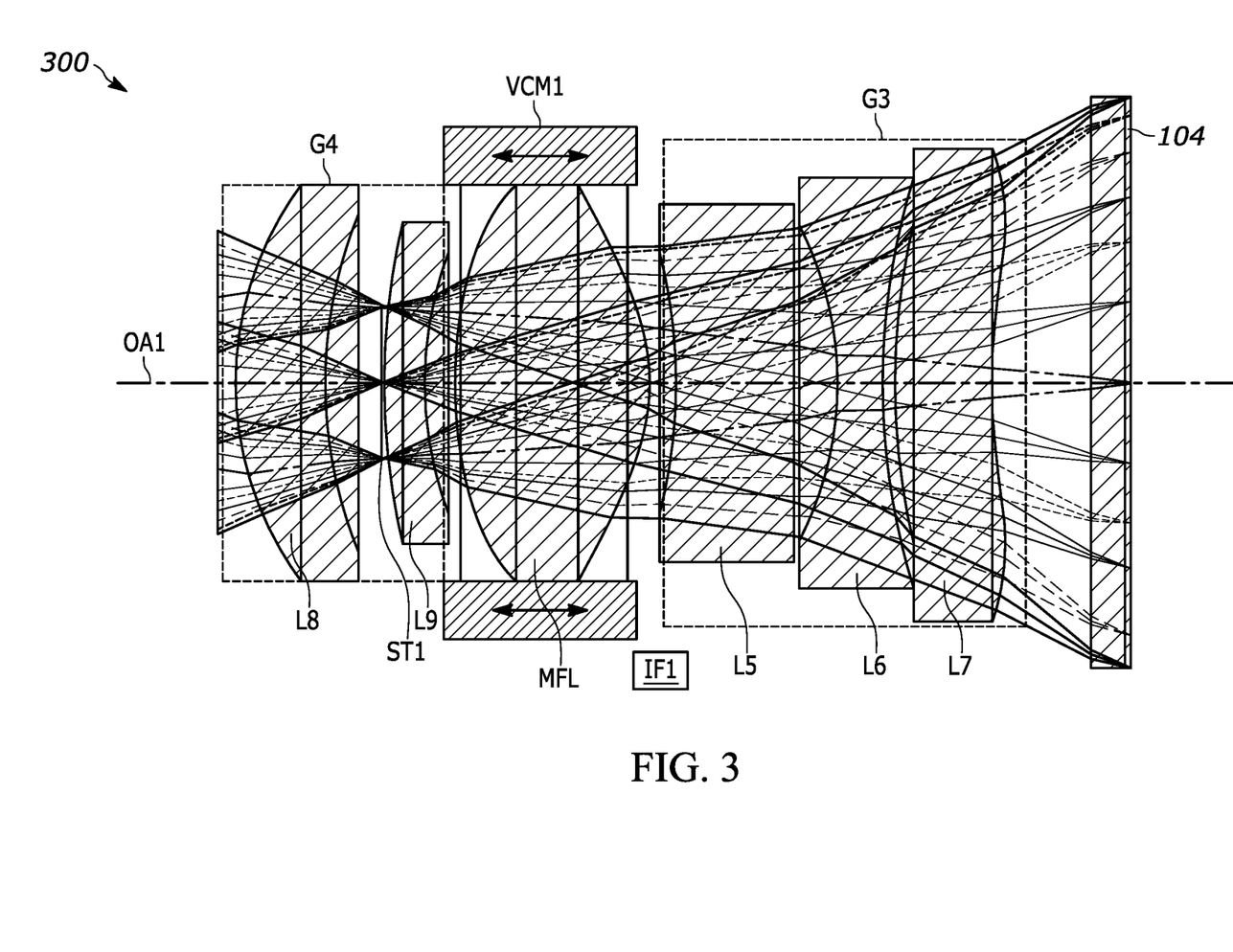
FIG. 3 is a cross-sectional side view of another example optical assembly having a voice coil motor to focus the optical assembly, in accordance with aspects of this disclosure, that may be used to implement the optical assembly of FIG. 1.

FIG. 3 illustrates another example optical assembly in the form of an optical assembly 300 that may be used to implement the example optical assembly 105 of FIG. 1. Compared to FIG. 2, in the example of FIG. 3, a back lens group G3 includes three lens elements L5, L6 and L7, among possible other optical assembly changes. The example optical assembly 300 of FIG. 3 provides optical performance similar to the optical assembly 200, but supports a sensor with a smaller CRA of 18 degrees instead of 32 degrees to, for instance, support wider-angle lenses.

FIG. 4 illustrates an example mount assembly 400 for mounting an optical assembly such as the optical assemblies 200 and 300 to, for example, a printed circuit board 402. The mount assembly is configured to hold a front lens group G5, a moveable focus lens MFL, a voice coil motor VCM1, and a back lens group G6 in relative position along an optical axis OA2 to form an image on the image sensor 104. In the example of FIG. 4, the mount assembly 400 includes a back lens holder H1 to mount (e.g., hold fixed) a back lens group G6 of lens elements L10 and L11 to the printed circuit board 402. The back lens holder H1 is fixedly mounted, connected, etc. (e.g., using an adhesive, solder, etc.) to the printed circuit board 402 at a plurality of connection points, one of which is designated at reference numeral C1, or in a continuous or semi-continuous fashion (e.g., a bead or line of adhesive). The back lens holder H1 as a light shield also shields the image sensor 104 from stray light, light contamination, etc. The voice coil motor VCM1 is fixed mounted, connected, etc. to a voice coil holder H2 of the back lens holder H1, as shown in FIG. 4. The voice coil holder H2 may be an integral portion of the back lens holder H1, or be connected to the back lens holder H1. A front lens holder H3 for the front lens group G5 mounts (e.g., holds fixed) lens elements L10 and L11 of the front lens group G6 to the back lens holder H1 and, thus, to the printed circuit board 402. In some examples, (i) the mount assembly 400 of FIG. 4 including the lenses L10-L13, the voice coil motor VCM and the moveable focus lens MFL are assembled, (ii) the mount assembly 400 is actively aligned with the image sensor 104 on the printed circuit board 402 based on optical measurements and (iii) once aligned, the mount assembly 400 is fixedly attached (e.g., connected, adhered, solder, etc.) to the printed circuit board 402. In a preferred embodiment, the lens holders H1, H2 and H3 are molded out of a light absorbing plastic material.

In some examples, the interface(s) between the VCM and the PCB are implemented as traces and/or contacts on the holders H1 and H2, which are preferably optically non-transparent black plastic held in place with thermally or UV cured adhesive.

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described examples, examples, implementations, etc. should not be interpreted as mutually exclusive, and should instead be understood as potentially combinable if such combinations are permissive in any way. In other words, any feature disclosed in any of the aforementioned examples, examples, implementations, etc. may be included in any of the other aforementioned examples, examples, implementations, etc.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

The invention claimed is:

1. An optical assembly for a focusing lens, the optical assembly comprising:
    a front lens group disposed along an optical axis configured to receive light from an object of interest and configured to correct for aberrations of a first image projected by the front lens group, the front lens group including an aperture stop;
    a moveable focus lens to receive light through the front lens group;
    a voice coil motor configured to move the focus lens; and
    a back lens group disposed along the optical axis configured to receive light from the focus lens and further configured to correct for field curvature,
    wherein:
        the front lens group is statically positioned with respect to the back lens group along the optical axis;
        the focus lens is an aspheric crown plastic optical element having an optical power greater than a total power of the optical assembly and greater than a combined optical power of the front lens group and the back lens group;
        the front lens group includes a first positive crown glass optical element, the aperture stop, and a negative flint aspheric plastic optical element;
        the back lens group includes one or more plastic aspheric optical elements arranged to form a negative optical power; and
        the front lens group and the focus lens are arranged to form a Cook triplet.

2. The optical assembly of claim 1, wherein the front lens group, the focus lens, and the back lens group are arranged in a telephoto arrangement.

3. The optical assembly of claim 1, further comprising:
    a mount configured to mount the optical assembly to a barcode reader; and
    an interface to convey position data for the focus lens to a processor of the barcode reader, and to receive control data for the voice coil motor from the processor,
    wherein the back lens group is configured to form a second image on an image sensor of the barcode reader, the image sensor is configured to generate an electrical signal representative of the second image, and provide the electrical signal to the processor.

4. The optical assembly of claim 3, wherein the object includes a barcode, and the processor is configured to decode the barcode from the electrical signal.

5. The optical assembly of claim 3, wherein the image sensor is a solid-state imager.

6. The optical assembly of claim 1, wherein the front lens group further includes a negative optical element configured to increase a field-of-view of the optical assembly.

7. The optical assembly of claim 1, wherein the back lens group is configured to match a chief ray angle of an image sensor.

8. The optical assembly of claim 1, wherein the focus lens is an only moveable optical element of the optical assembly.

9. The optical assembly of claim 1, wherein the front lens group and the back lens group are arranged to prevent damage to the focus lens.

10. The optical assembly of claim 1, wherein an overall optical power of the front lens group combined with the back lens group is configured to be less than an optical power of the focus lens to at least one of reduce sensitivity to mechanical tolerances, manage imaging lens aberrations, and compensate for thermal variation of the focus lens.

11. The optical assembly of claim 1, wherein the front lens group includes a lens element L1, a lens element L2, and the aperture stop positioned between the lenses L1 and L2, and wherein the back lens group includes a lens element L3 and a lens element L4.

12. The optical assembly of claim 11, wherein:
    the front lens group includes a lens element L1 having a spherical surface, a substantially flat surface and a positive optical power, and a lens element L2 having aspherical surfaces and a negative optical power;
    the focus lens has two aspherical surfaces and a positive optical power; and
    the back lens group includes a lens element L3 having aspherical surfaces and a negative optical power, and a lens element L4 having aspherical surfaces and a negative optical power.

13. The optical assembly of claim 11, wherein:
    the lens element L1 is formed of a Crown type glass material with an Abbe value approximately 56, an index of refraction of about 1.70, a positive overall optical power, a first surface of the lens element L1 is spherical, and a second surface of the lens element L1 is substantially flat;
    the lens element L2 is formed of a plastic material of Flint type with an Abbe value about 23, an index of refraction of about 1.64, a negative overall optical power, and both surfaces of the lens element L2 are aspherical;
    the lenses L1 and L2 formed to manage an overall spherical aberration;

the focus lens is formed of a plastic material with an Abbe value of 55, an index of refraction of about 1.54, a positive overall optical power, and both surfaces of the focus lens are aspherical;

the lens element L3 is formed of a Crown type plastic material with an Abbe value of 55, an index of refraction of about 1.54, a negative optical power, a first negative optical power aspherical surface, and a second negative optical power aspherical surface;

the lens element L4 is formed of a Crown type plastic material with Abbe value of 23, an index of refraction of about 1.64, a negative optical power, a first aspherical surface having a negative optical power, and the second aspherical surface have a positive optical power; and the lenses L3 and L4 formed to manage at least one of an imaging lens field curvature, and astigmatism, or a distortion.

14. The optical assembly of claim 13, wherein the plastic material used to form the focus lens including at least one a K26R material, a Xeonex material, or an Acrylic material.

15. The optical assembly of claim 1, further comprising a lens holder with a front aperture, the lens holder configured to hold the front lens group, the focus lens, the voice coil motor, and the back lens group in position along the optical axis to form a second image on an image sensor.

16. The optical assembly of claim 1, further comprising an illumination system configured to illuminate an object for imaging of the object.

* * * * *